(No Model.) 2 Sheets—Sheet 1.
M. LEITCH.
MEANS FOR OILING LOOSE WHEELS OR PULLEYS.
No. 523,670. Patented July 31, 1894.
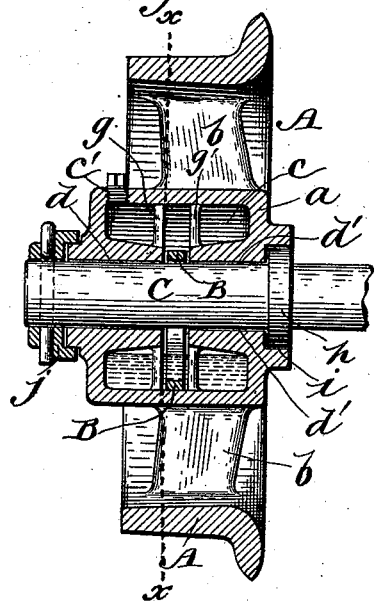
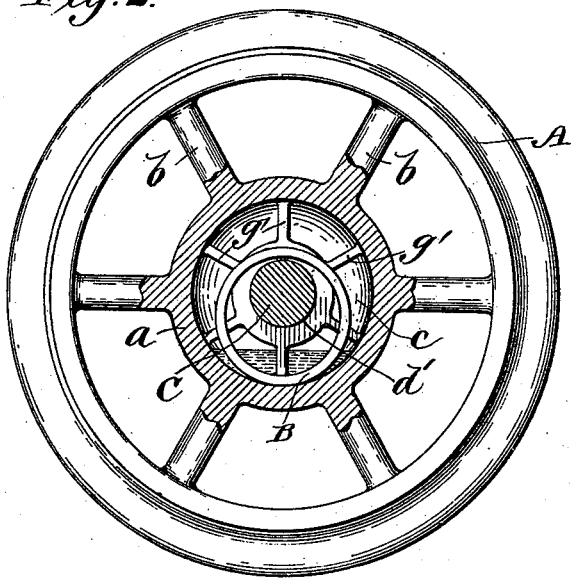
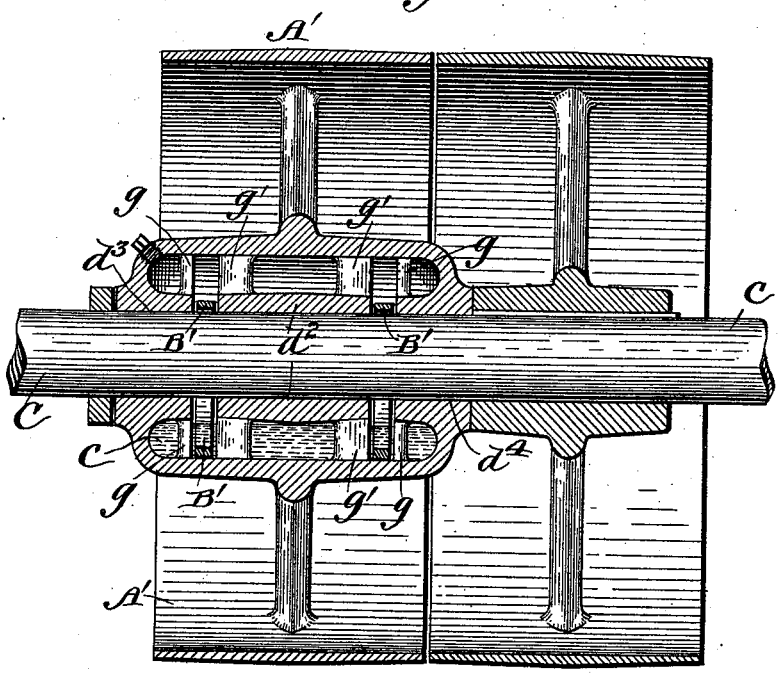
Witnesses
Inventor
Meredith Leitch
by Mason Fenwick Lawrence
his Attorneys (No Model.) 2 Sheets—Sheet 2.
M. LEITCH.
MEANS FOR OILING LOOSE WHEELS OR PULLEYS.
No. 523,670. Patented July 31, 1894.
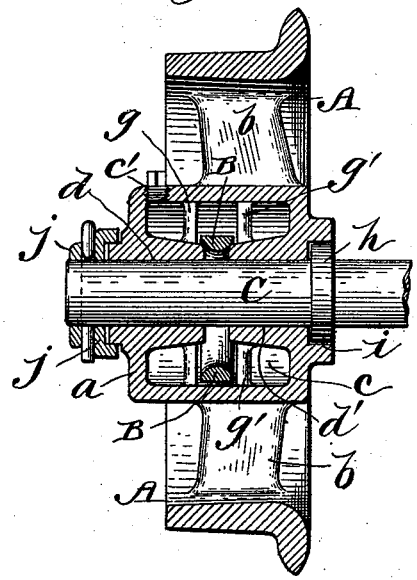
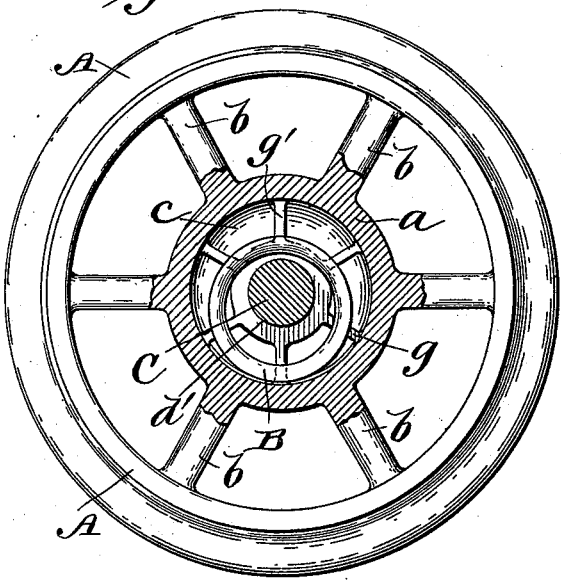
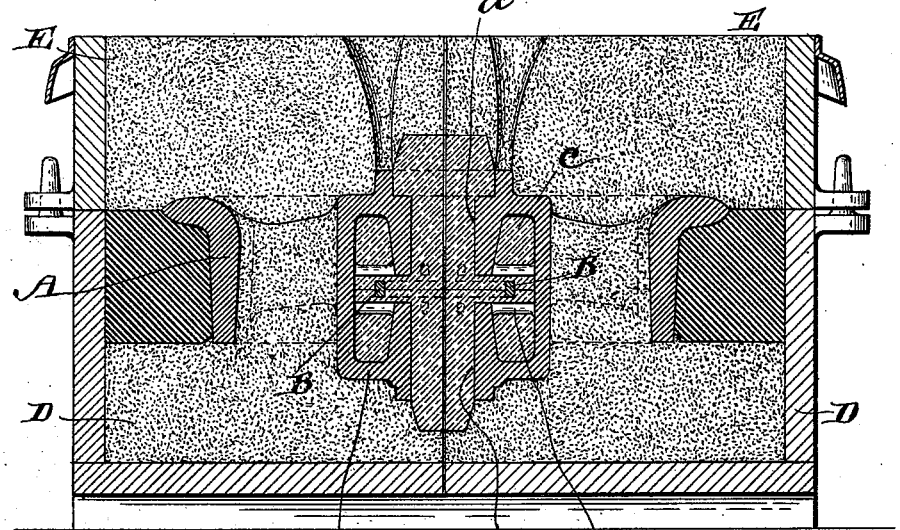
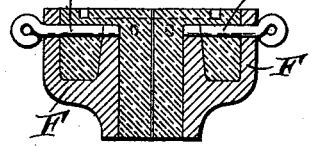
Witnesses
Severance
W. Harry Muzzy
Inventor
Meredith Leitch
by Mason, Fenwick & Lawrence
his Attorneys.

UNITED STATES PATENT OFFICE.

MEREDITH LEITCH, OF COVINGTON, VIRGINIA.

MEANS FOR OILING LOOSE WHEELS OR PULLEYS.

SPECIFICATION forming part of Letters Patent No. 523,670, dated July 31, 1894.

Application filed February 27, 1894. Serial No. 501,685. (No model.)

*To all whom it may concern:*

Be it known that I, MEREDITH LEITCH, a citizen of the United States, residing at Covington, in the county of Alleghany and State of Virginia, have invented certain new and useful Improvements in Means for Oiling Loose Wheels or Pulleys; and I do hereby declare the following to be a full, clear, and exact description of the invention, such as will enable others skilled in the art to which it appertains to make and use the same.

My invention relates to revolving pulleys and loose pulleys provided with means for oiling such wheels and pulleys and their stationary shafts or axles at the point where the wheels or pulleys and axles or shafts have bearing contact with each other.

My invention consists in the combination of a revolving wheel or loose pulley having a chambered, lubricant-holding hub, a stationary axle or shaft and a revolving oil or lubricant-conveying rigid ring arranged within the hub of the wheel or pulley and around the axle or shaft; said ring being revolved by the hub and resting with a portion of its inner surface in close relation to but not in contact with the axle or shaft, so that a portion of its inner surface comes in contact with the peripheries of circular inner bearings of the hub, or a portion of its periphery comes in contact with the inner surface of the hub proper; and said ring shall be confined against straight lateral movement and diagonal movement, as will be hereinafter described.

My invention also consists in the combination with a single piece cast metal revolving wheel or pulley formed with circular, integral, internal bearing portions for a stationary shaft or axle, an oil or lubricant holding chamber surrounding said circular bearing portions, confining arms between the peripheries of the hub and the circular bearing portions, one or more rigid rings fitted within the hub and between the said arms, so as to be revolved by contact with the hubs, and also be kept from straight, sidewise or oblique lateral movement while revolving as will be hereinafter described.

In the accompanying drawings, Figure 1. is a vertical central section of a revolving car wheel and a portion of a stationary axle, constructed in accordance with my invention. Fig. 2. is a vertical section on the line $x$—$x$ of Fig. 1. Fig. 3. is a vertical central section similar to Fig. 1. but showing my invention applied to a loose pulley. Fig. 4. is a section of a wheel like Figs. 1 and 2 except that the ring is held slightly away from both the axle and the inner surface of the chamber of the hub, whereas in Fig. 1. it is allowed to come in close relation to the axle and in contact with the inner surface of the chamber of the hub. Fig. 5 is a section similar to Fig. 2. but also showing the difference stated and described in Fig. 4. Fig. 6 is a vertical section of a mold illustrating a method of casting my improved wheel, and Fig. 7 is a vertical section of a core box for one half of the central core.

A in the drawings, is a car wheel having a hub $a$ and arms $b$. The hub is formed with an oil or other fluid lubricant chamber $c$ leading into which, at one end, is a screw plugged supply passage $c'$. At each end of the hub where the usual passages for the axle are formed, stout internal integral circular bearing portions $d$, $d'$ are formed on the hub, the same extending respectively a suitable distance but not so as to abut against each other. The ends of these bearing portions are connected with the metal of the inner surface of the hub by radial, spaced arms $g$, $g'$ and thus are stayed against the weight and strain which come upon the rim and hub of the wheel. Between the inner ends of the bearing portions $d$, $d'$ a ring B of metal or other suitable material is arranged loosely. This ring is, in the illustration shown in Figs. 1 and 2, of diameters internally and externally sufficiently large to admit of the passage of a car axle C as illustrated, within its bore, and to allow of the periphery of the ring coming in contact with the inner surface of the oil chamber.

The axle C is made stationary and the hub of the wheel fitted loosely upon it so as to be capable of revolving, by means of the usual fixed collar $h$ of the axle which is set into a circular recess $i$ in the inner end of the hub and by a flanged removable collar $j$ confined on the axle by a cotter or pin, or other suitable fastening. From this description it will be seen that the loose ring is arranged between the ends of the bearing portions and confined practically, against straight, sidewise and oblique movements, by means of said bearing portions and the spaced radial arms $g$, $g'$, while it is free to come in close relation to the axle and in contact with the inner surface of the oil or lubricant chamber, and to be revolved by the hub, as the inner surface of said hub comes in frictional contact with it. The action of the ring is to insure the lubrication of the wheel by conveying the oil or lubricant to the axle and bearing portions of the hub from the inner surface of the hub, to which point it is forcibly thrown by centrifugal force and would remain, were not this conveying ring provided in the hub for conveying it away from said inner surface of the hub.

I am aware that rings for conveying oil or lubricant are not new broadly but it is new to have a ring or rings combined with a fixed axle and revolved by the hub of a wheel or pulley; and it is also new to provide a means such as I have described for confining the ring against straight, sidewise and oblique movements while it is being revolved by the hub of the wheel.

I have shown the ring as confined within a hub cast in one piece, but it is obvious that the hub might be cast in two pieces with bolting flanges and the same bolted together after the ring is set in between the arms $g$, $g'$, but while this is the case it is much cheaper and far preferable to cast the ring within the hub of the wheel as shown.

As another practical way of employing my invention I have, in Fig. 3., shown it applied to a loose pulley A'. In this application of my invention two loose rings B', instead of a single ring B are provided; each of these rings being confined between a central bearing portion $d^2$ and two end bearing portions $d^3$, $d^4$. In all other respects the invention shown in said Fig. 3. is the same as shown in Figs. 1 and 2.

In Figs. 4 and 5 the invention as represented is the same as shown in Figs. 1, 2, and 3, except that the ring B is made wider than the space between the integral circular bearing portions $b$, $b'$ and is suspended and made to ride upon the inner ends of said bearing portions of the hub, while its periphery does not come in contact with the inner surface of the hub of the wheel or loose pulley. This change is made in order to have the speed of the ring less rapid than is the case with the construction shown in Figs. 1, 2 and 3, as in some cases difference in the speed of the ring is desirable; hence I have made provision for change of the speed of the ring; in both constructions however the hub revolves the ring.

In Figs. 6 and 7 I have shown a mold for casting the wheel with the ring B within the oil chamber of its hub. This mold comprises a newel D, a cope E, and core box F. From these views it will be seen that the chill and pattern for the rim, arms and hub are placed in the newel and the sand packed around the same; and that the core is formed in the two parts of the core box and in forming it an annular recess half the width of the ring B is impressed in the surface of each; the spaces for the arms $g$, $g'$ being formed by pins $m$ inserted radially as shown, before the sand is rammed. The two parts of the core thus formed are withdrawn from the core box and the ring B placed between them, whereupon the parts are cemented together and the core is then set into the center of the newel D as shown in Fig. 6. and then the cope is placed in position and the metal flowed through gates into the mold and the product is a wheel of the construction shown in Figs. 1 and 2.

Of course by suitable changes in the mold, without any departure from my invention, the product may be a wheel such as is shown in Figs. 4 and 5, or a loose revolving pulley as shown in Fig. 3.

What I claim as my invention is—

1. The combination, with a stationary axle or shaft, of a revolving wheel or loose pulley having a chambered oil or lubricant holding hub with annularly spaced bearing portions and one or more non-absorbent revolving oil or lubricant conveying rigid rings arranged within the hub of the wheel or pulley and between said bearing portions and adapted to come in contact with the hub itself and be revolved by frictional contact with the hub, subtantially as and for the purpose described.

2. A revolving cast metal wheel or loose pulley in one piece and having a hub formed with an oil or lubricant holding chamber, internal circular bearing portions, and spaced confining arms, in combination with one or more loose revolving oil or lubricant conveying rigid rings, located and confined between said arms, and arranged to come in contact with the hub itself and be revolved thereby, substantially as described.

3. A loose pulley or wheel for stationary axles or shafts, comprising in its construction a hub formed with an oil or lubricant holding chamber having internal, circular bearing portions, and spaced confining arms, and one or more loose, revolving oil or lubricant conveying rigid rings located and confined between the arms so that when the pulley or wheel is in use on a fixed axle or shaft, the ring or rings will come in contact with the hub itself and be revolved thereby, substantially as described.

In testimony whereof I hereunto affix my signature in presence of two witnesses.

MEREDITH LEITCH.

Witnesses:
JOHN S. HAM,
G. M. BOOKMAN.